UNITED STATES PATENT OFFICE.

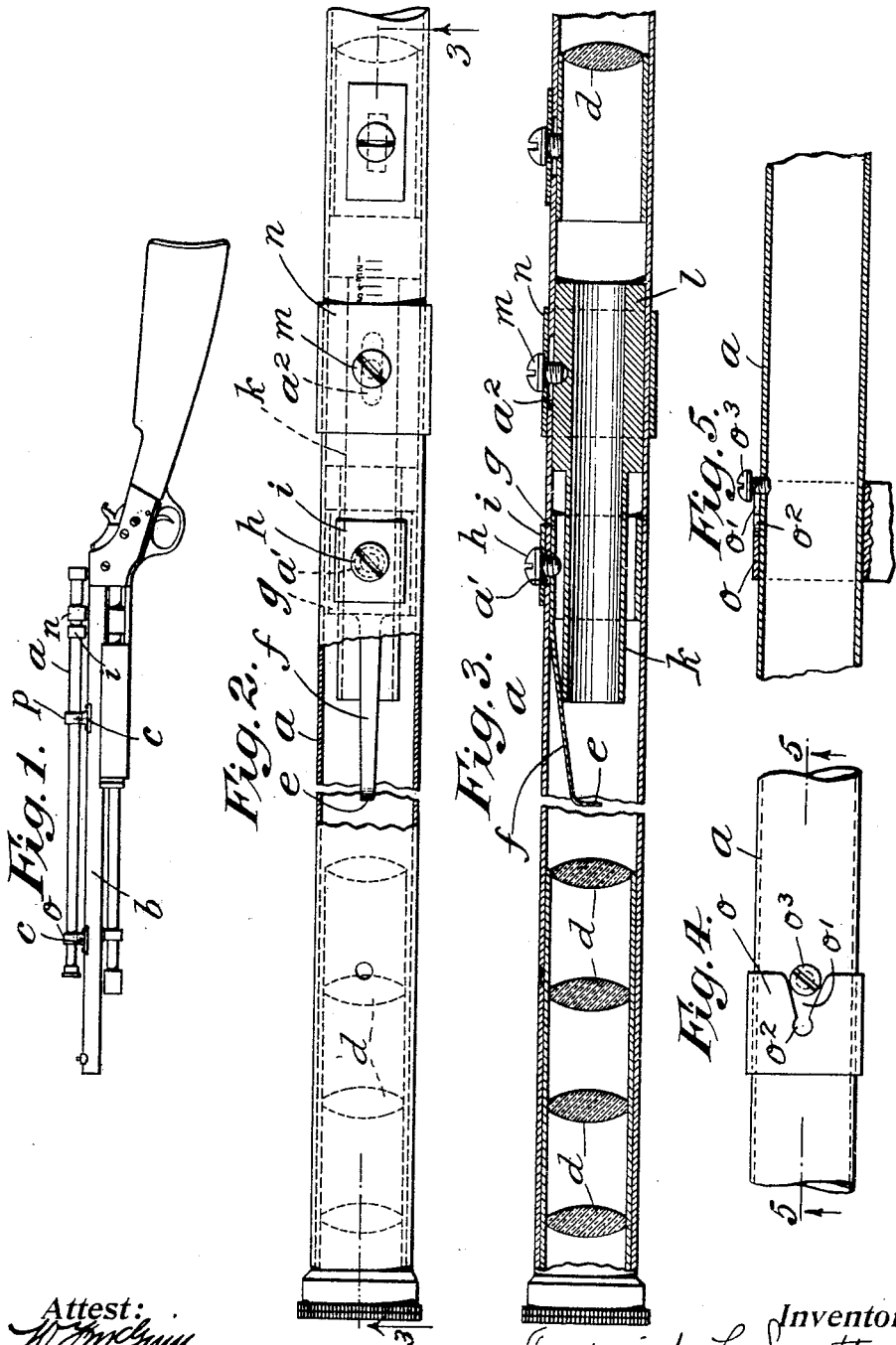

FREDERICK L. SMITH, OF CHICOPEE FALLS, MASSACHUSETTS.

TELESCOPE-SIGHT FOR FIREARMS.

966,254.　　　　Specification of Letters Patent.　　Patented Aug. 2, 1910.

Application filed April 5, 1910.　Serial No. 553,623.

*To all whom it may concern:*

Be it known that I, FREDERICK L. SMITH, a citizen of the United States, residing in Chicopee Falls, in the State of Massachusetts, have invented certain new and useful Improvements in Telescope-Sights for Firearms, of which the following is a specification, reference being had to the accompanying drawing, forming a part hereof.

This invention has for its object to improve the means for adjusting telescope sights for rifles, the improvements being designed with special reference to their application to telescope sights in which ease and quickness of adjustment and clearness are desired rather than extreme fineness of sighting.

The invention is particularly concerned with the focusing and adjustment for elevation of a pin head or other sighting point within the telescope tube.

It is also concerned with the means for permitting or preventing the sliding movement of the telescope with respect to the barrel of the firearm on which it is mounted.

The invention will be more fully explained hereinafter with reference to the accompanying drawing in which it is illustrated and in which—

Figure 1 is a view in side elevation of an ordinary sporting rifle with a telescope sight mounted on the barrel thereof. Fig. 2 is a detail top view of the telescope, partly broken out to show some of the interior parts, and broken off to save space. Fig. 3 is a longitudinal vertical section on the plane indicated by the line 3—3 of Fig. 2. Fig. 4 is a detail top view showing the forward mount and a portion of the telescope tube with the device for preventing or permitting relative longitudinal movement and securing correct rotary adjustment of the telescope. Fig. 5 is a detail view in section on the plane indicated by the line 5—5 of Fig. 4.

The telescope tube $a$, of suitable length and diameter, may be mounted upon the barrel $b$ of the firearm by any suitable mounts, such as are indicated at $c, c$. The tube $a$ is also provided with suitable lenses, as at $d, d$, which may have any preferred arrangement, the invention being independent of the number and arrangement of the lenses. In order to vary the sighting elevation, for different ranges, it is usual to raise or lower the rear end of the telescope tube, the cross hairs or other sights being fixed with relation to the axis of the telescope tube.

In accordance with the present invention, the elevation sight within the telescope tube is made adjustable vertically with respect to the axis of the tube, so as to secure the desired sighting elevation, and is also made adjustable longitudinally in order that it may be properly placed with respect to the focus of the lens. It may also be capable of angular adjustment.

As shown in Figs. 2 and 3 the sight $e$, either pin head or notched plate or of any other suitable character, is carried by a spring finger $f$ which projects from a sleeve $g$, the sight being extended downwardly from above because of the reversal of the image by the lenses in the arrangement shown. Obviously the arrangement of the lenses may be such as to effect no reversal of the figure and in such case the sight would of course be extended upwardly from below. If the sight $e$ is to occupy a fixed relation, longitudinally, with respect to the adjacent lenses, the sleeve $g$ may be permanently fixed within the tube $a$, but as it is usually desirable to permit the sight $e$ to be adjusted longitudinally with respect to the lenses, so as to be properly focused, and as it may also be desirable to permit of a limited angular adjustment of the sight $e$, the sleeve $g$ is preferably movable to a limited extent within the tube $a$ and for this purpose a screw $h$ may be passed through an enlarged aperture $a'$ in the tube $a$ and be threaded into the sleeve $g$, a curved plate $i$, fitting the tube snugly, being interposed between the head of the screw $h$ and the tube $a$ to cover completely the opening $a'$. By loosening slightly the screw $h$, the sleeve $g$ may be pushed forward or back to place the sight $e$ properly with respect to the focus of the adjacent lens, or it may be rotated slightly to one side or the other to adjust the angular position of the sight $e$ and the screw $h$ may then be set up tightly to hold the sleeve in position.

For the purpose of adjusting the sight $e$ for changes in elevation, means are provided for pressing the spring finger $f$ more or less toward the top of the tube. As shown, such means consist of a tube $k$ which passes through the sleeve $g$ and is longitudinally adjustable with respect to the spring finger $f$, which rests upon the extremity of the tube $k$. The tube $k$ is carried by a sleeve $l$ which fits within the telescope tube $a$ and may be held in adjusted position by a screw $m$ which passes through a guard plate $n$ and a slot $a^2$ into the sleeve $l$. When the screw $m$ is slightly loosened the sleeve $l$ may be moved toward the front or rear to raise the sight $e$ or permit it to descend more or less as may be required.

It will be understood that in the practical use of the telescope, the user first adjusts the sight $e$ longitudinally so as to focus it properly, securing it in focus by setting up the screw $h$. Then he adjusts the sleeve $l$ longitudinally for the purpose of securing the proper elevation of the sight $e$. Noting the marking shown by the arbitrary scale on the telescope tube he can then readily adjust the elevation for the same range at any other time.

The telescope tube $a$ is mounted as usual in sleeves $o$ and $p$ secured on the barrel of the firearm. It is usually adjustable in the rear sleeve $p$ for windage and elevation and it is usually movable longitudinally in both the front sleeve $o$ and in the rear sleeve or mount $p$. Some users, however, prefer that the telescope tube shall not be movable longitudinally relative to the barrel. For the purpose, therefore, of permitting the tube to be held from longitudinal movement or to have relative longitudinal movement and also to be restored automatically to proper angular position after longitudinal movement, in order that the sight $e$ may be properly positioned, there is formed in the rear side of the front mount $o$ a V-shaped slot $o'$ terminating in or having at its apex a slightly enlarged circular hole $o^2$, and in the tube is mounted a screw or pin $o^3$ having a shank of such diameter as to fit freely within the circular part $o^2$ of the notch, so as to prevent relative longitudinal movement when it is so desired. By removing the screw or pin $o^3$, shifting the tube slightly to the rear and then replacing the screw, the screw coöperates with the V-shaped slot $o'$, when the telescope tube is returned to forward position, after rearward displacement, and insures automatically and without attention the correct rotary adjustment or angular positioning of the telescope tube within the mount.

I claim as my invention:

1. In a telescope sight, the combination with a telescope tube, of a sight located within the tube, an inclined spring arm secured within the tube and supporting the sight, a support longitudinally movable with respect to the spring and the tube and coöperating with said spring arm to shift the sight with respect to the axis of the tube, and means to secure said support in adjusted position.

2. In a telescope sight, the combination with a telescope tube, of a sight located within the tube, an inclined spring arm secured within the tube and supporting the sight, and a tube longitudinally movable within the telescope tube with respect to the spring and tube and forming at its extremity a support for said spring arm.

3. In a telescope sight, the combination with a telescope tube, of a sleeve mounted in the tube, a spring arm extended from said sleeve, a sight supported by said arm in proximity to the axis of the tube, and a second sleeve mounted in the tube and adjustable longitudinally and having an extension to coöperate at its extremity with the spring arm and shift the sight with respect to the axis of the tube.

4. The combination with a firearm and a telescope sight, of a sleeve-like mount secured to the firearm and having in its rear side a V-shaped notch terminating in a slightly enlarged hole, and a pin secured movably in the tube and adapted to fit freely within the enlarged part of the notch.

This specification signed and witnessed this 30th day of March, A. D. 1910.

F. L. SMITH.

Signed in the presence of—
A. F. CROWTHER,
JAS. F. CARRAHER.